United States Patent
Simmendinger et al.

(10) Patent No.: US 11,802,002 B2
(45) Date of Patent: Oct. 31, 2023

(54) MODULAR CONVEYOR BELT HAVING FLUID GUIDING STRUCTURES

(71) Applicant: Habasit AG, Reinach (CH)

(72) Inventors: Stefan Simmendinger, Wahlen (CH); Dietmar Elsner, Loörrach (DE)

(73) Assignee: Habasit AG, Reinach (CH)

( * ) Notice: Subject to any disclaimer, the term of this patent is extended or adjusted under 35 U.S.C. 154(b) by 0 days.

(21) Appl. No.: 17/608,453

(22) PCT Filed: Apr. 28, 2020

(86) PCT No.: PCT/EP2020/061693
§ 371 (c)(1),
(2) Date: Nov. 2, 2021

(87) PCT Pub. No.: WO2020/221717
PCT Pub. Date: Nov. 5, 2020

(65) Prior Publication Data
US 2022/0212880 A1    Jul. 7, 2022

(30) Foreign Application Priority Data

May 2, 2019   (EP) ..................... 19172198

(51) Int. Cl.
*B65G 45/22*   (2006.01)
*B65G 17/08*   (2006.01)

(52) U.S. Cl.
CPC ............. *B65G 45/22* (2013.01); *B65G 17/08* (2013.01); *B65G 2207/26* (2013.01)

(58) Field of Classification Search
CPC .... B65G 17/083; B65G 17/086; B65G 17/40; B65G 17/08; B65G 23/06; B65G 2207/26; B65G 2207/30

(Continued)

(56) References Cited

U.S. PATENT DOCUMENTS 506,456 A * 10/1893 Adt .................. B65G 17/08
5,170,883 A * 12/1992 Ledet ................ B65G 17/08
                                                    198/834

(Continued)

FOREIGN PATENT DOCUMENTS

| WO | 9015763 A1 | 12/1990 |
| WO | 2007073161 A1 | 6/2007 |
| WO | 2009012608 A1 | 1/2009 |

*Primary Examiner* — Mark A Deuble
(74) *Attorney, Agent, or Firm* — Hodgson Russ LLP

(57) ABSTRACT

Modular conveyor belt (1) comprising a first row of one or more belt modules (11) and an interlinked second row of one or more belt modules (12). A belt module of the first row comprises a first plurality of link ends (31) extending in a direction of belt travel (T) and having a pivot rod opening disposed therein in a direction substantially perpendicular to the direction of belt travel (T) wherein a belt module of the second row comprises a second plurality of link ends (32) extending in a direction opposite to the direction of belt travel (T) and having a pivot rod opening therein in a direction substantially perpendicular to the direction of belt travel (T) wherein The first plurality of link ends (31) and the second plurality of link ends (32) are intercalated and hingedly connected by a pivot rod (40) disposed through the pivot rod openings wherein the belt module of the first row comprises on its bottom side several fluid guiding structures (50) designed and arranged so as to deflect a fluid jet impinging on the bottom side and guide the deflected fluid jet towards the second row of one or more belt modules (12).

23 Claims, 6 Drawing Sheets

Figure 1:
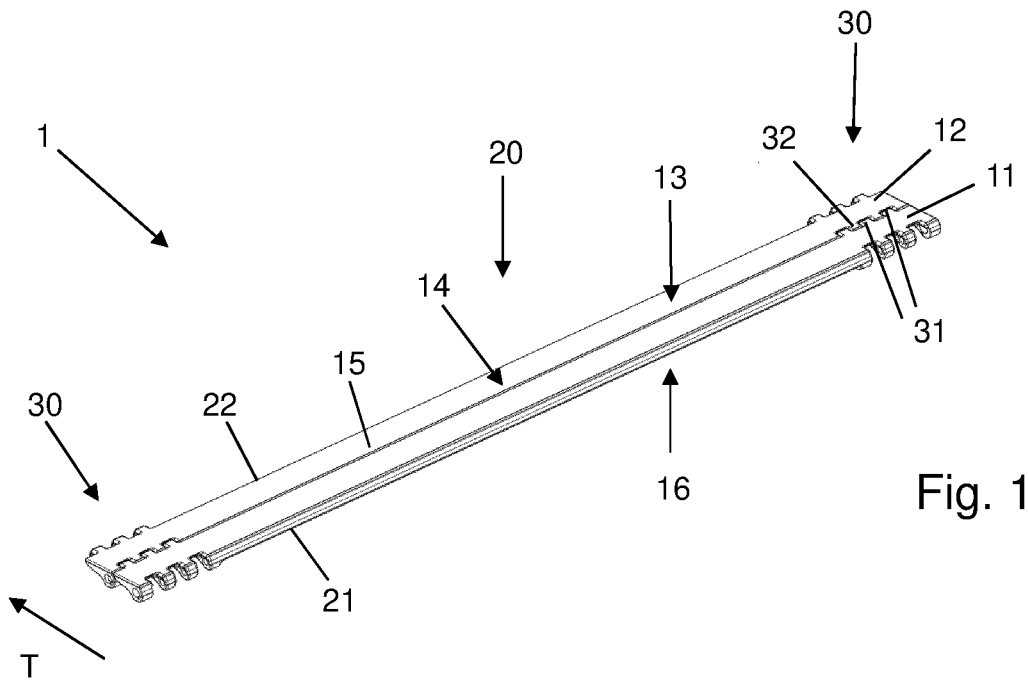

(58) Field of Classification Search
USPC .......................................................... 198/853
See application file for complete search history.

(56) References Cited

U.S. PATENT DOCUMENTS

| | | | | |
|---|---|---|---|---|
| 5,335,768 | A | * | 8/1994 | Schladweiler ......... B65G 47/52 |
| | | | | 474/224 |
| 2006/0278500 | A1 | | 12/2006 | Guernsey |
| 2009/0000921 | A1 | | 1/2009 | Guldenfels et al. |
| 2011/0094856 | A1 | | 4/2011 | Guldenfels et al. |
| 2016/0332821 | A1 | * | 11/2016 | van den Berg ........ B65G 17/08 |
| 2017/0088356 | A1 | * | 3/2017 | Lucchi ................... B65G 17/34 |
| 2019/0023495 | A1 | | 1/2019 | Massey, Jr. |
| 2022/0212875 | A1 | * | 7/2022 | Elsner .................... B65G 23/06 |

* cited by examiner

MODULAR CONVEYOR BELT HAVING FLUID GUIDING STRUCTURES

The present invention relates to modular conveyor belts according to the preambles of claims 1 and 11 and to a conveyor system according to claim 21.

Whenever objects have to be transported over comparatively short distances, and in particular within a production site, modular conveyor belts are a suitable and commonly used tool. Depending on the actual application the modular conveyor belt is used for, the modular conveyor belt must comply with varying requirements.

In particular, modular conveyor belts that are used in food industry have to be easily cleanable. Further, the material of the modular conveyor belt should not contaminate foodstuff in any way. Therefore, in food industry plastic conveyor belts are widely used. Contrary to metal conveyor belts, they do not corrode, are lightweight and are easy to clean. For easier scalability, quite often modular plastic conveyor belts are used that are made up of moulded plastic belt modules that can be arranged side-by-side in rows of selectable width. A series of spaced apart link ends arranged at the leading and trailing edges (sides) of the modules include aligned openings to accommodate a pivot rod. The link ends along one side of a row of belt modules are interconnected with the link ends of an adjacent row of belt modules. A pivot rod journaled in the aligned openings of connected modules forms a hinge between adjacent rows. Rows of belt modules are then connected together to form an endless conveyor belt capable of articulating about a drive sprocket. If the length of the modular conveyor belt exceeds a certain size, quite often conveyor rollers or supporting slides are used to support the modular conveyor belt. Such conveyor rollers can be either rolling passively (essentially being driven by the modular conveyor belt), or they can be active, meaning that they actively drive the modular conveyor belt. In the latter case, typically sprockets are used.

Furthermore, in food industry, solid or flat-top modular plastic conveyor belts are frequently used for meat, fish, or other products that drip or tend to drop crumbs or particles. The top of such belts can present a smooth, flat surface with very small gaps at the proximity region between two adjacent belt modules. Thanks to the usual design with link ends that comprise pivot rod openings and pivot rods that are arranged through such pivot rod openings, it is possible to bend the modular conveyor belt around sprockets, in particular around end-sited sprockets, so that an endless belt can be formed. In such regions where adjacent belt modules are tilted with respect to each other, gaps are normally opened between two adjacent belt modules. This makes it possible to clean the gaps between the adjacent belt modules, in particular link ends, which is particularly important in the food industry. Steam or hot water, which may include cleaning agents and disinfectants, can be used for such cleaning purposes.

EP 3 353 098 A discloses a modular conveyor belt comprising a first row with a hybrid belt module and an interlinked second row with a hybrid belt module, wherein the hybrid belt modules comprise intercalated and hingedly connected link ends and sections without link ends.

While conveyor systems of the prior art are already quite functional, there is always a need for better cleaning possibilities to better meet present and future hygiene requirements. In particular, a better cleaning possibility may permit the use of less aggressive disinfectants, while the disinfection level of the arrangement can be maintained.

The present invention meets the above-described need by providing a modular conveyor belt according to independent claim 1, a modular conveyor belt according to independent claim 11 and a conveyor system according to independent claim 21. Particularly advantageous embodiments of the invention result from the dependent claims.

The core of the invention lies in the following: A modular conveyor belt comprises a first row of one or more belt modules and an interlinked second row of one or more belt modules. At least one of the belt modules of the first row comprises on its bottom side at least one fluid guiding structure designed and arranged so as to deflect a fluid jet impinging on the bottom side and guide the deflected fluid jet towards the second row of one or more belt modules.

Preferably, at least one of the belt modules of the first row comprises a first plurality of link ends extending in a direction of belt travel and at least one of the belt modules of the second row comprises a second plurality of link ends extending in a direction opposite to the direction of belt travel. The first plurality of link ends and the second plurality of link ends are intercalated and hingedly connected.

In an advantageous embodiment, the first plurality of link ends have a pivot rod opening disposed therein in a direction substantially perpendicular to the direction of belt travel and the second plurality of link ends have a pivot rod opening disposed therein in a direction substantially perpendicular to the direction of belt travel. The first plurality of link ends and the second plurality of link ends are hingedly connected by at least one pivot rod disposed through at least some of the pivot rod openings.

The modular conveyor belt according to the invention is quite similar to modular conveyor belts that are presently known in the state of the art. Therefore, such a modular conveyor belt can be used in combination with present apparatuses with minor modifications, or even without any modification at all. An advantage of the presently proposed design is that the fluid jets that are frequently used for cleaning purposes in combination with modular conveyor belts, in particular in food industry, can be directed towards portions of the modular conveyor belt that are particularly prone to agglomeration of dirt or bacteria and/or that are problematic to be reached by a fluid jet directly out of the fluid nozzle (no direct line-of-sight). A fluid jet that comes out of a nozzle can be directed to the fluid guiding structures of the modular conveyor belt and is then deflected or redirected by the fluid guiding structures into a different direction (as compared to the original direction of the fluid jet). In particular, the deflected fluid jet is guided into a direction, in particular towards the second row of one or more belt modules, where a cleaning action of the fluid jet is particularly desirable. This can be an area that can hardly be reached by a directly impinging fluid jet; an area that needs a particularly thorough cleaning; an area, where a cleaning process is more effective, if the fluid jet impinges in a certain direction (for example because particles will be washed out of the modular belt); and the like.

For example, the fluid guiding structure can be shaped in a way that the aiming point/outflow direction, towards which the fluid jet is directed or guided, remains more or less constant during a forward movement of the modular conveyor belt in its moving direction or direction of belt travel (at least when being at certain repetitively occurring positions). However, additionally or alternatively, the fluid guiding structure can be designed in a way that the aiming point and/or direction, where the impinging fluid jet is directed to, varies during the forward movement of the modular conveyor belt. The impinging fluid jet can impinge in a direction that is essentially perpendicular to the respective bottom surface of the belt module, or can be tilted with respect to the belt module, for example at an angle of up to 10°, 20°, 30°, 40° or 50° (with respect to the perpendicular direction). The fluid guiding structure can be shaped in a way that the cross section of the impinging fluid jet remains more or less unaltered. Additionally or alternatively, the cross section of the impinging fluid jet can be influenced by the fluid guiding structure as well.

A region, where two adjacent belt modules of the first and second row of one or more belt modules come close to each other (and possibly may touch each other, at least at certain positions during a movement cycle of the modular conveyor belt), may be called a proximity region. It is to be noted that such a proximity region typically necessitates a thorough cleaning, since in these regions the top surface of the modular conveyor belt, onto which goods are placed, is interrupted by a small gap. As an example, if foodstuff is transported, any fluid that flows out of the goods will usually flow through the small gap between two adjacent belt modules. Therefore, thorough cleaning of the respective region is important.

Another region that is somehow problematic with respect to cleaning considerations is the region of the link ends. This is not only because portions of the link ends are arranged in the proximity region, but also because in the link end region, the design of the modular conveyor belt is typically relatively complicated (at least on the bottom side of the belt modules) and typically has some regions that are hard to reach from the outside. Quite often there will be areas that cannot be reached by a line-of-sight axis from the outside and are therefore problematic to clean with directly impinging fluid jets. Only for completion, it should be noted that the fluid jet can for example contain water (in particular water at an elevated temperature and/or water containing some cleansing additive and/or some disinfectant). However, the advantages of the presently proposed modular conveyor belt can be achieved with essentially all kinds of fluid. When talking about fluid jets, certainly a different shape of a water stream can be chosen as well. As an example, some kind of a water curtain can be used as well.

Advantageously, at least one of the belt modules of the second row comprises on its bottom side at least one fluid guiding structure designed and arranged so as to deflect a fluid jet impinging on the bottom side and guide the deflected fluid jet towards the first row of one or more belt modules. Providing at least one of the belt modules of the second row on its bottom side with at least one fluid guiding structure provides similar advantages like providing at least one of the belt modules of the first row on its bottom side with at least one fluid guiding structure.

Preferably, at least one of the fluid guiding structures is shaped without edges or corners. The avoidance of edges and corners, i.e. the use of rounded or arcuate shapes, results in a smoother deflection and guidance of an impinging fluid jet. Turbulences can be reduced.

In a preferred embodiment of the modular conveyor belt according to the invention, at least one of the fluid guiding structures has a channel-like design. Such a channel-like design makes it possible to deflect and guide the impinging fluid jet into the desired direction.

Advantageously, at least one of the fluid guiding structures comprises an outwardly fan-shaped portion designed and arranged so as to direct an impinging fluid jet towards at least one side surface of at least one of the link ends and/or towards at least one exposed section of at least one pivot rod and/or to spread out the impinging fluid jet. With such a design, it is possible to direct the fluid towards a comparatively large portion of the modular conveyor belt, while still using a comparatively small fluid jet. Furthermore, it is possible to split up the fluid jet into a plurality of fluid jets (where the resulting fluid jets need not necessarily be separate from each other; i.e. some kind of a fluid curtain might be created). In this way, it is particularly simple to clean the side surfaces of the link ends, in particular of link ends that have a pivot rod opening. In particular, a contact region between a pivot rod opening of a link end and a pivot rod can be cleaned more easily using such a design.

When talking about a fan-shaped portion, this preferably relates to an arrangement where a circular jet with a comparatively small diameter is spread over a certain width (in particular in the widthwise direction of the modular conveyor belt), while its height remains comparatively small (for example about the same size like the original diameter of the impinging fluid jet). This can be reached by some kind of V-shaped channel, where the opening angle of the channel can be up to 10°, 20°, 30°, 40° or 50° (where a lower limit for the angle can be 0° or one of the previously mentioned angles).

Preferably, at least one of the fluid guiding structures is arranged between two of the link ends of one of the belt modules. This makes it possible to easily deflect and guide the impinging fluid jet to side surfaces of both link ends and to the front surface and both side surfaces of an intercalating link end of an adjacent belt module of an adjacent row of one or more belt modules.

In an advantageous embodiment, at least one of the fluid guiding structures has a trough-like or shovel-like shape. Such a trough-like or shovel-like shape makes it easier to deflect and guide the impinging fluid jet to the front surface and both side surfaces of an intercalating link end of an adjacent belt module of an adjacent row of one or more belt modules.

It should be mentioned that in case a plurality of fluid guiding structures are used, those fluid guiding structures can have essentially the same design and/or can have different designs. Of course, it is possible to use a first fraction of the fluid guiding structures with a first design, while a second fraction of the fluid guiding structures can have a different design. The fractional shares may vary, as well as the number of different designs.

Advantageously, at least one of the belt modules comprises at least one section, preferably at least one middle section, without link ends. In this way, the number of link ends can be reduced and the design of the modular conveyor belt can be simplified. Because the link ends and their vicinity are usually comparatively difficult to clean, using the presently suggested design makes cleaning easier, and in particular less fluid for cleaning purposes is needed. Therefore, fewer fluid pumps are needed and/or the pumps can be designed less powerful. Energy for pumping fluid can be reduced as well.

In an advantageous embodiment, at least one of the fluid guiding structures is arranged on at least one of the sections without link ends. Providing the sections without link ends also with fluid guiding structures enables a better cleaning of these sections similar to the sections comprising link ends.

In a preferred embodiment of the modular conveyor belt according to the invention, between the first row of one or more belt modules and the interlinked second row of one or more belt modules a gap is formed which broadens towards the bottom side of the conveyor belt. Using such a design, it is possible to further improve the cleanability of the modular conveyor belt. The impinging fluid can be directed in a way that cleaning of a proximity region (gap region) is improved, even if no fluid guiding structure is present in the respective section. This can be particularly the case for a middle section, as previously described.

Advantageously, the belt modules are designed and arranged such that the gap is essentially closed at a top surface of the modular conveyor belt when the first row of one or more belt modules and the interlinked second row of one or more belt modules are aligned along a substantially straight line and such that the gap is open at the top surface of the modular conveyor belt when the first row and the second row are tilted with respect to each other. In this way, it is less likely that any goods (or parts thereof) that are to be transported by the modular conveyor belt can get stuck between adjacent belt modules or may even pass through between two adjacent belt modules (and consequently get lost). Nevertheless, it is still possible to provide a very effective cleaning possibility in certain areas, in particular in areas where the modular conveyor belt runs over a sprocket and is returned.

Furthermore, it proves to be advantageous if the top surface of the modular conveyor belt is essentially plane and closed when adjacent rows of one or more belt modules are arranged along a substantially straight line. In this way, the modular conveyor belt is particularly advantageous for transporting certain goods, in particular for transporting foodstuff.

In an advantageous embodiment of the modular conveyor belt according to the invention, the belt modules of the first row and of the second row are identical. In this way, the overall design of the modular conveyor belt is easier, so that the modular conveyor belt can be produced cheaper. Further, it is easier to adapt the length of the modular conveyor belt to the required length. However, for special cases, a different design of adjacent belt modules might be advantageous as well.

According to an alternative advantageous embodiment it is suggested that the local design of two adjacent belt modules is similar, when seen along the moving direction of the modular conveyor belt, at least within a certain section along the width of the modular conveyor belt. In this way, it is possible to use belt modules that are varying in size, in particular along the width of the final modular conveyor belt. Nevertheless, when considering a small width section of the modular conveyor belt, the modular conveyor belt looks like it is constructed of essentially identical belt modules, which may be advantageous in the region of a sprocket (usually having a comparatively small width).

Figure 2:
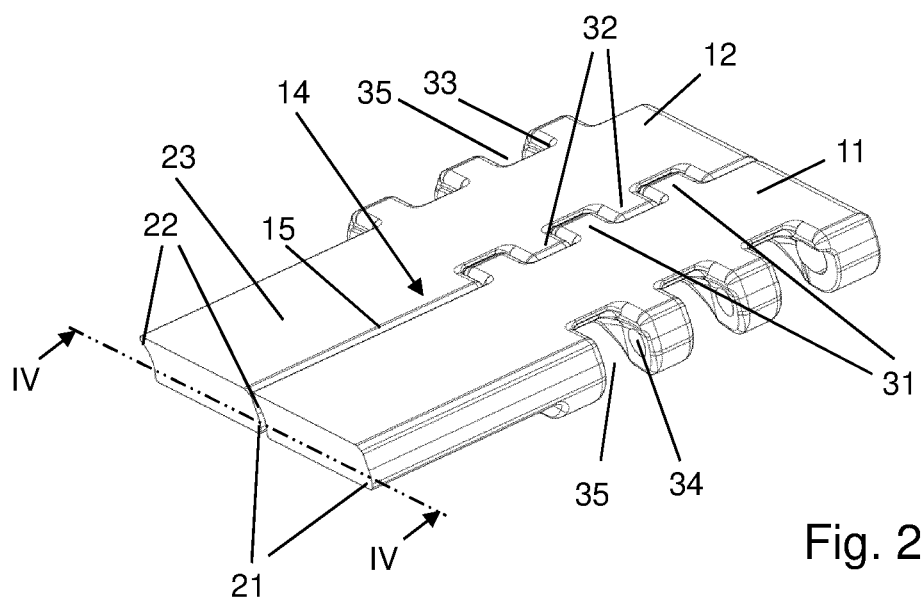
Figure 3:
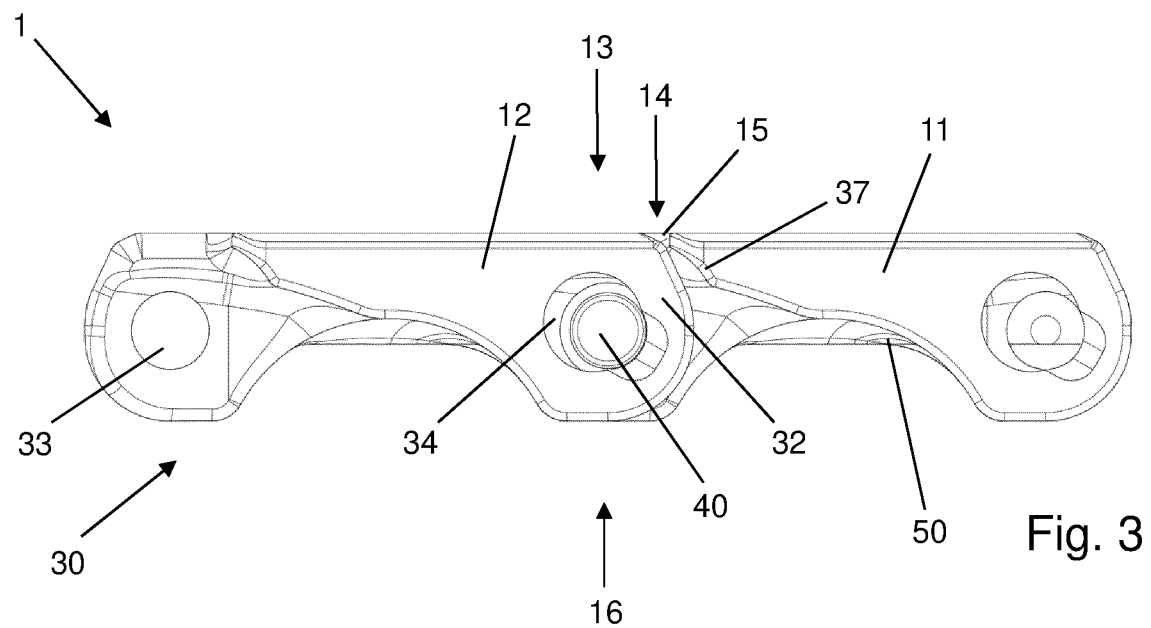
Figure 4:
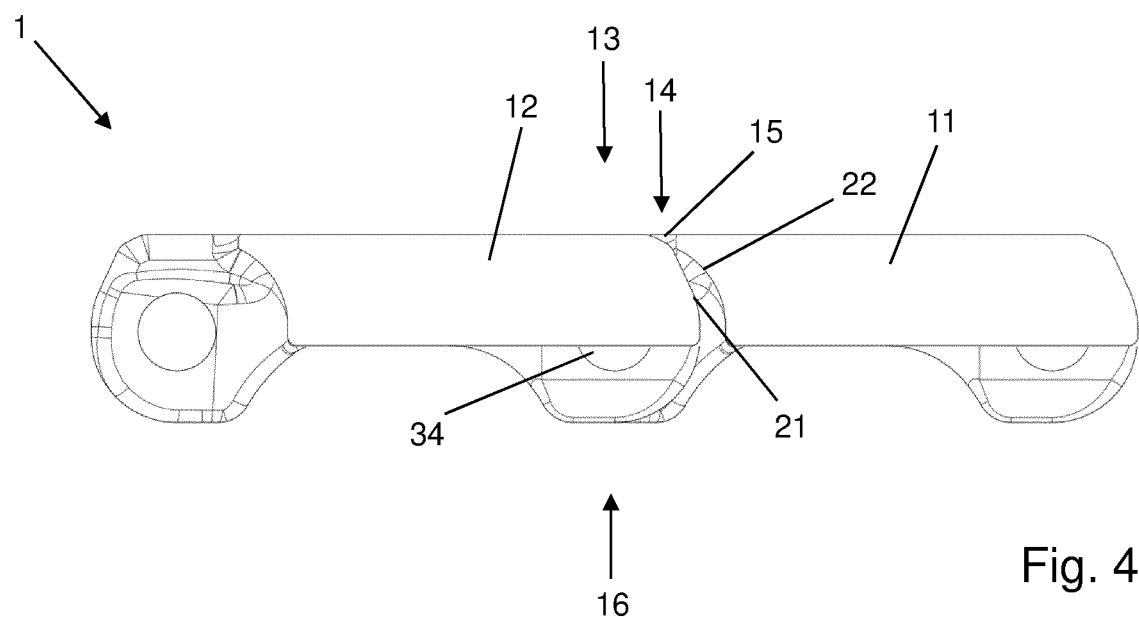
Figure 5:
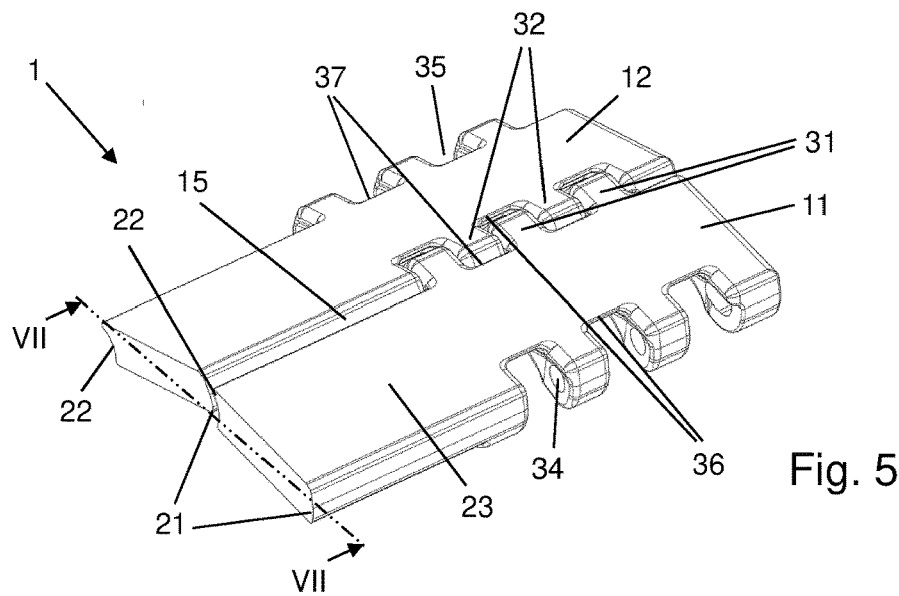
Figure 6:
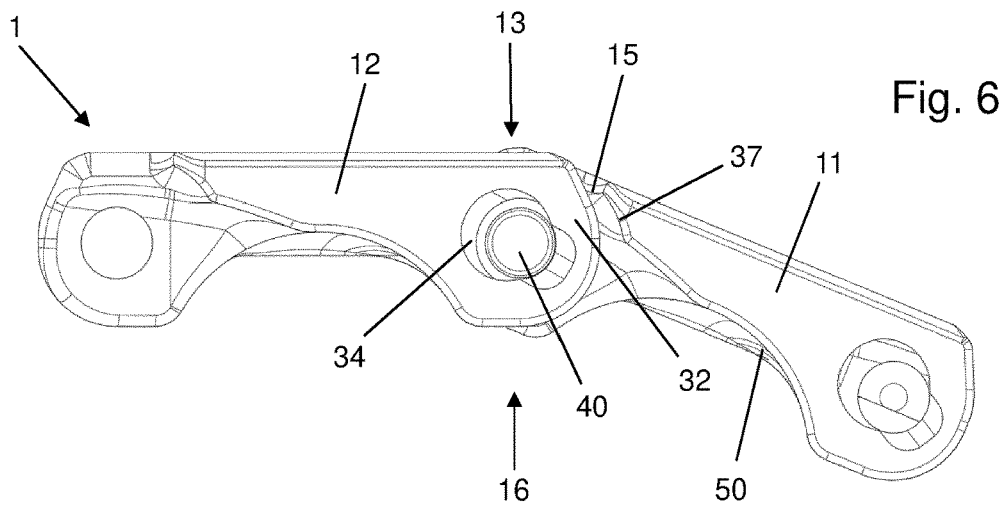
Figure 7:
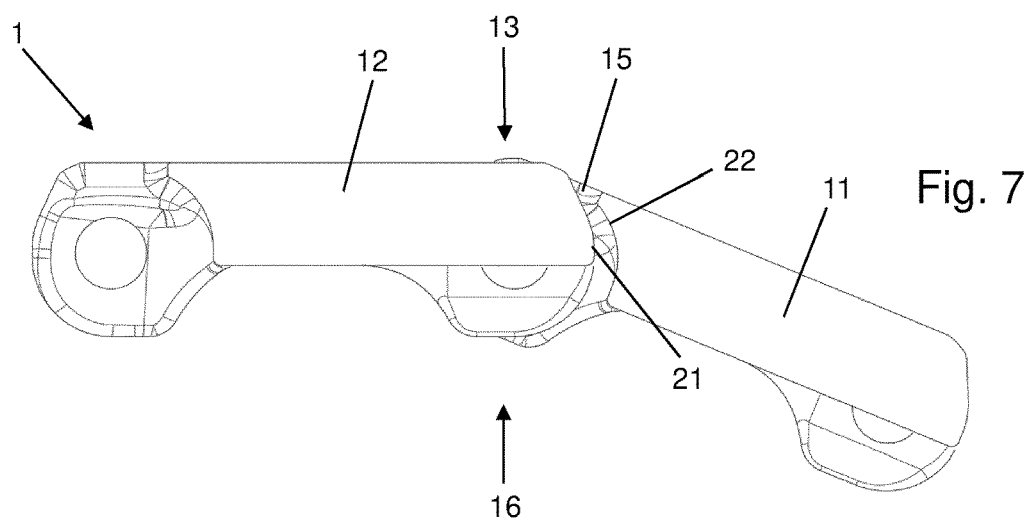
Figure 8:
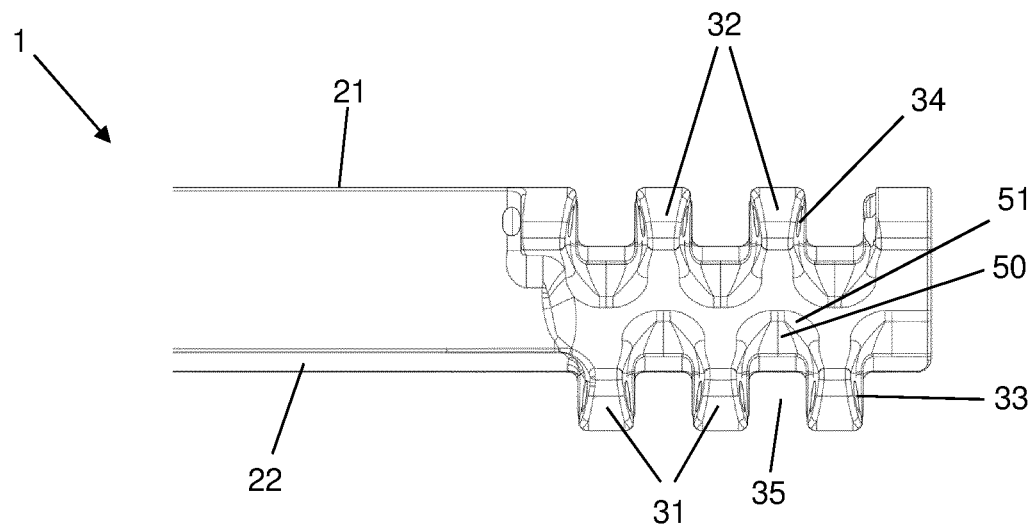
Figure 9:
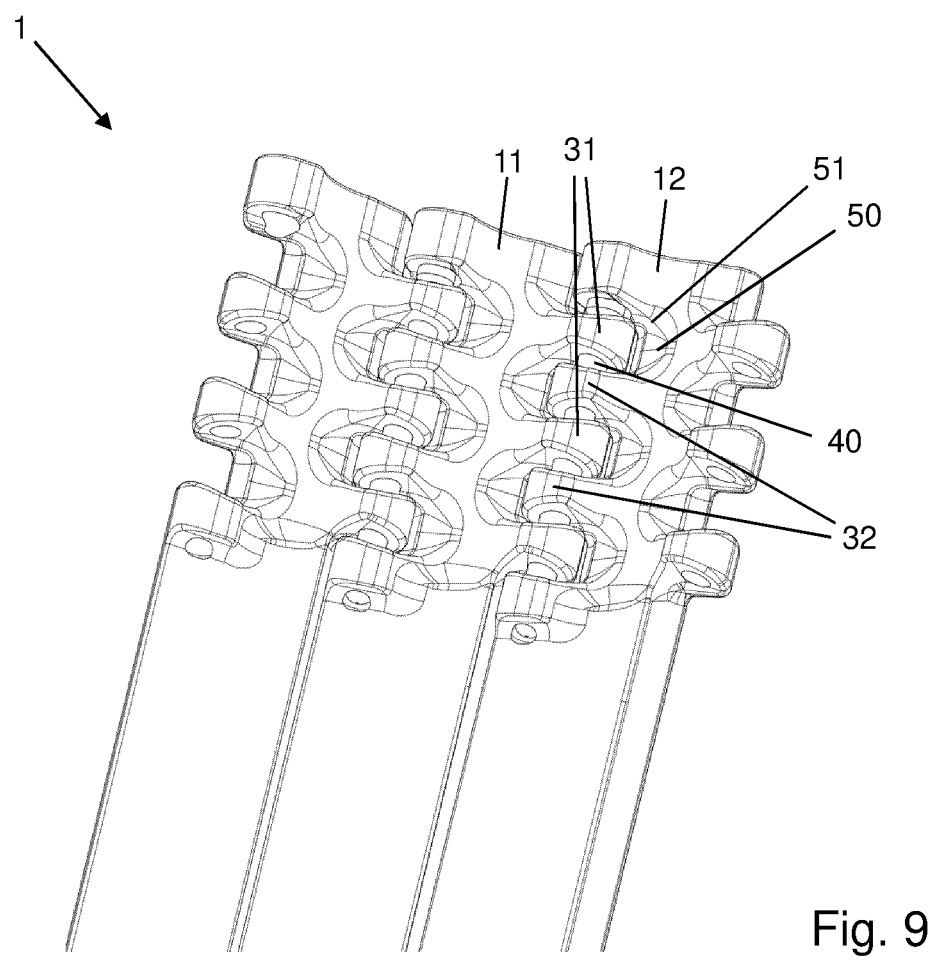
Figure 10:
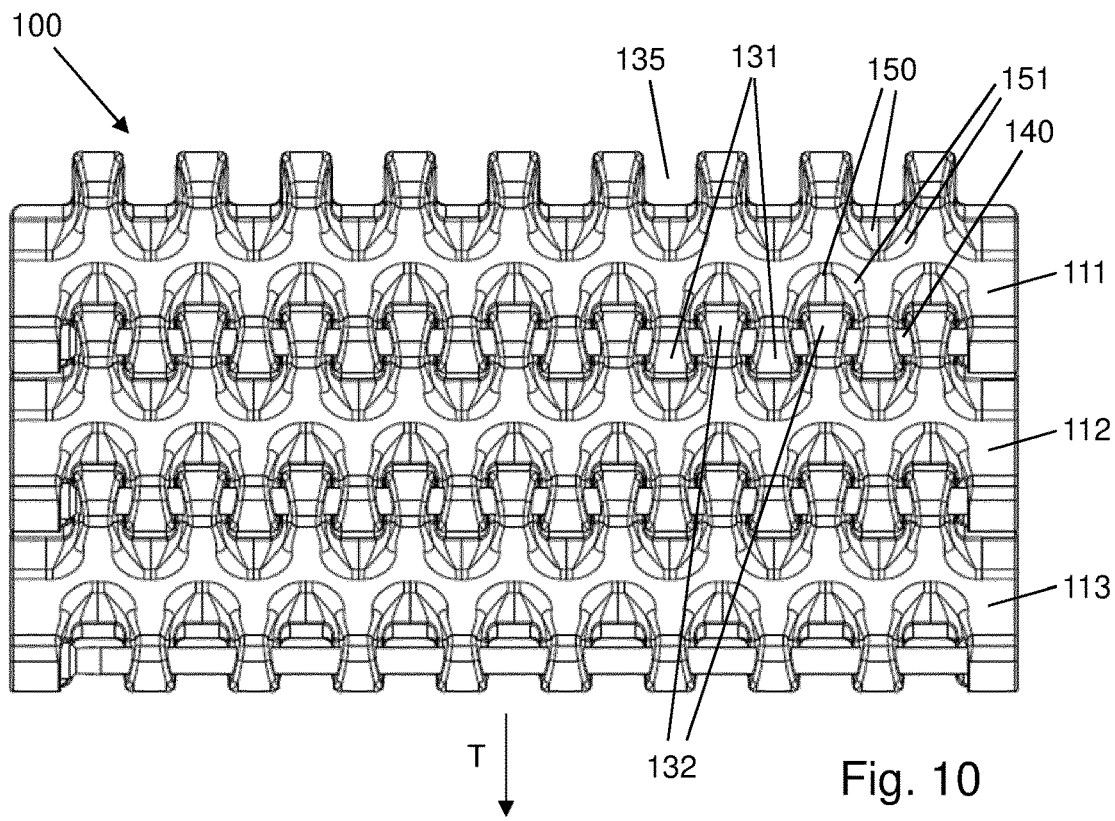
Figure 14:
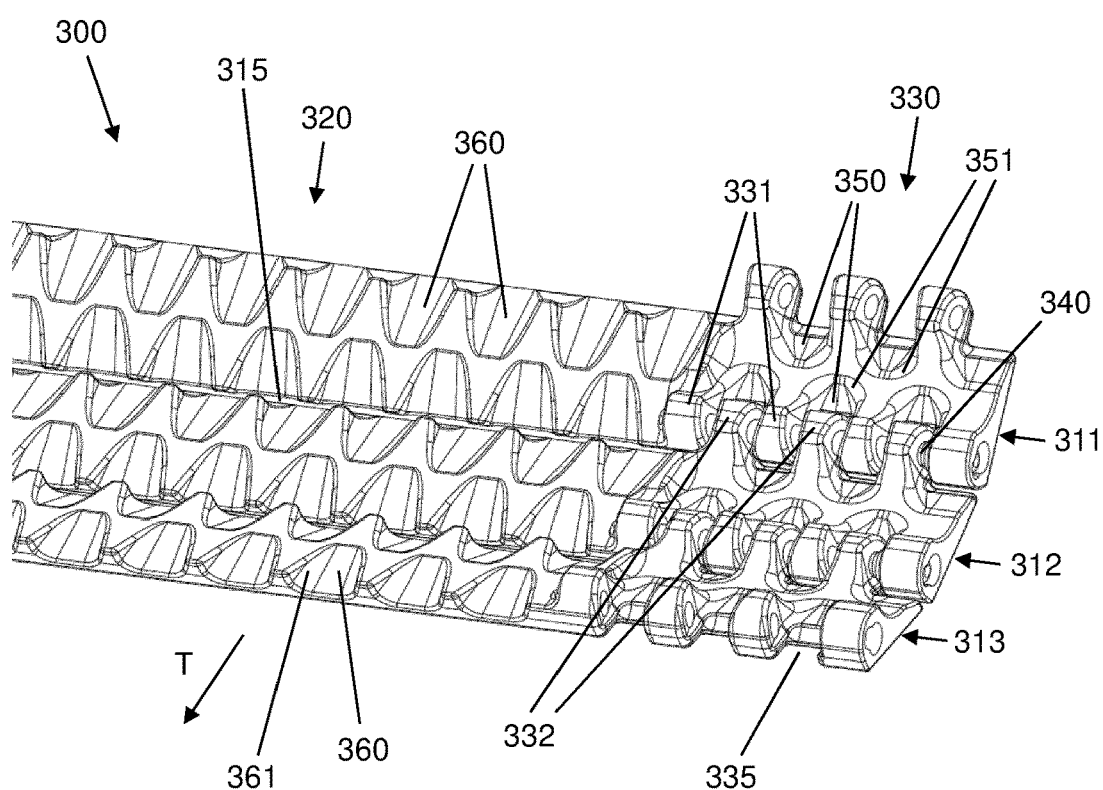
Figure 11:
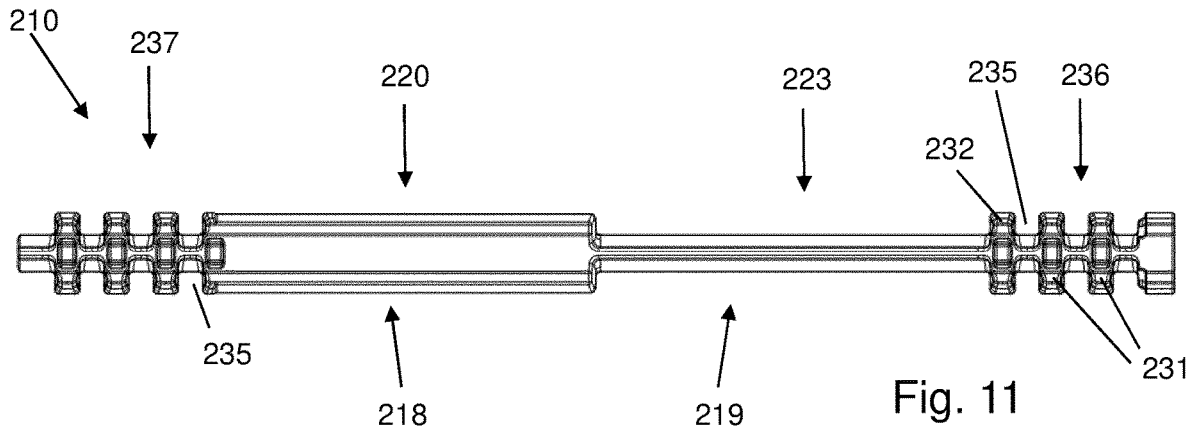
Figure 12:
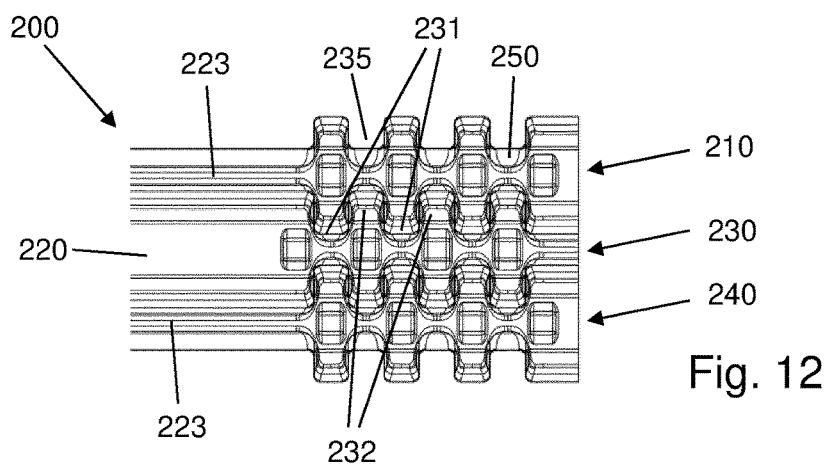
Figure 13:
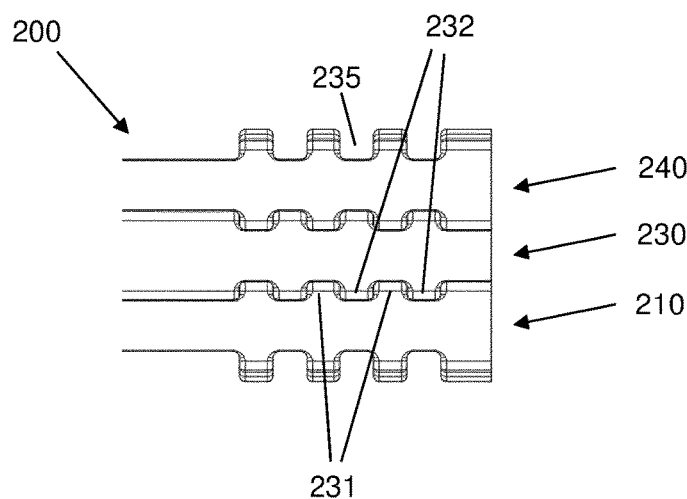

Further advantages, features, and objects of the invention will be apparent from the following detailed description of four embodiments of a modular conveyor belt according to the invention in conjunction with the associated drawings, wherein the drawings show:

FIG. 1—an arrangement of two adjacent belt modules of two adjacent rows of one or more belt modules according to a first embodiment of the modular conveyor belt in a perspective view;

FIG. 2—a perspective view of a cut end section of the arrangement of belt modules of FIG. 1;

FIG. 3—a side view of the arrangement of belt modules of FIG. 1;

FIG. 4—a cross section through a middle section of the arrangement of belt modules of FIG. 1 according to line IV-IV in FIG. 2;

FIG. 5—a perspective view of the cut end section of the arrangement of belt modules shown in FIG. 2, where the belt modules are tilted with respect to each other;

FIG. 6—a side view of the arrangement of belt modules of FIG. 1, where the belt modules are tilted with respect to each other;

FIG. 7—a cross section through a middle section of the arrangement of belt modules according to line VII-VII in FIG. 5;

FIG. 8—a detail of an end section of a belt module according to FIGS. 1 to 7 in a bottom view;

FIG. 9—a cut end section of an arrangement of three belt modules of three rows of one or more belt modules in a perspective view from the bottom side;

FIG. 10—an arrangement of three belt modules of three rows of one or more belt modules according to a second embodiment in a bottom view;

FIG. 11—a belt module according to a third embodiment in a bottom view;

FIG. 12—a cut end section of an arrangement of three belt modules of three rows of one or more belt modules according to FIG. 11 in a bottom view;

FIG. 13—the cut end section of the arrangement of three belt modules of FIG. 12 in a top view; and FIG. 14—a cut section of an arrangement of three belt modules of three rows of one or more belt modules according to a fourth embodiment in a perspective view from the bottom side.

The following observations apply in respect of the description which follows: where, for the purpose of clarity of the drawings, reference signs are included in a Figure but are not mentioned in the directly associated part of the description, reference should be made to the explanation of those reference signs in the preceding or subsequent parts of the description. Conversely, to avoid overcomplication of the drawings, reference signs that are less relevant for immediate understanding are not included in all Figures. In that case, reference should be made to the other Figures.

FIG. 1 shows a part of a modular conveyor belt 1 according to a first embodiment. Two adjacently arranged belt modules 11 and 12 are shown. The belt module 11 is part of a first row of one or more belt modules and the belt module 12 is part of a second row of one or more belt modules interlinked with the first row. The designs of both belt modules 11, 12 are identical. A top surface 13 of the modular conveyor belt 1 defines an essentially plane or flat surface.

The belt modules 11, 12 both have a middle section 20 and on both sides of the middle section 20 an end section 30.

The middle section roughly resembles to a cuboid 23 (see in particular FIG. 2). However, a leading edge 22 in the direction of belt travel T has a concave arcuate shape and a trailing edge 21 has a convex arcuate shape. It is to be noted that the notion of a leading edge 22 and a trailing edge 21 can be interchanged, in case the modular conveyor belt 1 is moved in an opposite direction.

The end sections 30 of each belt module 11, 12 comprise a first plurality of link ends 31 extending in a direction of belt travel T. Each link end 31 has a pivot rod opening 33 disposed therein in a direction substantially perpendicular to the direction of belt travel T (see also FIG. 2). The end sections 30 of each belt module 11, 12 also comprise a second plurality of link ends 32 extending in a direction opposite to the direction of belt travel T. Each link end 32 has a pivot rod opening 34 disposed therein in a direction substantially perpendicular to the direction of belt travel T. Between two link ends 31 or between two link ends 32, there is always an interspace 35 having a width which is bigger than the width of a link end 31 or 32, thus allowing to intercalate a link end 31 or 32 of an adjacent belt module.

As can be seen from FIG. 2, the link ends 31 of the first plurality of link ends and the link ends 32 of the second plurality of link ends are offset from each other. The first plurality of link ends 31 of the belt module 11 and the second plurality of link ends 32 of the belt module 12 are intercalated, wherein the link ends 31 and 32 of the belt modules 11 and 12 intercalate into the respective interspaces 35 between the link ends 32 and 31 of the belt modules 12 and 11, respectively.

The two belt modules 11 and 12 are arranged adjacent to each other in a proximity region 14 and the link ends intercalated, such that the pivot rod openings 33 and 34 of the link ends 31 and 32 are aligned, i.e. they form a line-of-sight tunnel through them. A common pivot rod 40 (see in particular FIG. 6) is disposed through these pivot rod openings 33, 34 and hingedly connects the two belt modules 11 and 12, i.e. a hinge is formed allowing a tilting of the belt modules 11 and 12 with respect to each other. The diameter of the pivot rod 40 is slightly smaller than the diameter of the pivot rod openings 33, 34.

FIG. 3 shows a side view of the arrangement of belt modules 11, 12 of FIG. 1, while in FIG. 4 a cross section through the middle sections 20 of the belt modules 11, 12 of FIG. 1 according to line IV-IV in FIG. 2 is shown.

In FIGS. 1 to 4, the modular conveyor belt 1 is shown in a state where the individual belt modules 11, 12 are arranged along a straight line. This is equivalent to a straight line running of the modular conveyor belt 1, in particular in a situation when goods are to be transported by the modular conveyor belt 1.

As can be seen particularly in FIGS. 3 and 4, the top side of the modular conveyor belt 1 forms an essentially flat top surface 13, not only with respect to a single belt module 11 or 12, but also with respect to an arrangement of both adjacent belt modules 11, 12. The top surface 13 is essentially closed, but a small gap 15 formed between the belt module 11 and the belt module 12 in the proximity region 14 cannot be completely avoided.

On the bottom side 16 of the modular conveyor belt 1, the leading edges 22 and the trailing edges 21 of the middle sections 20 as well as the link ends 31 and 32 of the two adjacent belt modules 11, 12 are designed and arranged in the proximity region 14 in a way that the gap 15 becomes wider, i.e. broadens, in the direction towards the bottom of the modular conveyor belt 1.

In FIGS. 5 to 7, the same modular conveyor belt 1 as shown in FIGS. 1 to 4 is shown in similar views (cf. FIGS. 2 to 4), however, this time the adjacent belt modules 11, 12 are arranged tilted with respect to each other. This situation typically occurs if the modular conveyor belt 1 is guided around sprockets and/or idlers. The sprockets and/or idlers are used for driving and guiding (in particular also returning) the modular conveyor belt 1, so that an endless modular conveyor belt can be created.

As can be seen from FIGS. 5 to 7 in particular, the leading edges 37 between the link ends 31 and the trailing edges 36 between the link ends 32 as well as the leading edges 22 in the middle sections 20 have a concave arcuate shape and they are tapered. The link ends 31 and the link ends 32 as well as the trailing edges 21 in the middle sections 20 have a convex arcuate shape. Further, the pivot rod openings 33, 34 are disposed in a distinct way in the link ends 31, 32, such that the pivot rod 40 is placed inside the pivot rod openings 33, 34 offset from the centre. This is done in a way that the tilting movement of the two adjacent belt modules 11, 12 results in an opening of the gap 15 between the belt modules 11, 12. In this way, the cleaning ability of the region of the gap 15 can be further ameliorated.

In FIGS. 8 and 9, some of the most important features of the claimed invention are visible. Close to the interspaces 35 between the link ends 31 and between the link ends 32 of a belt module 11, 12, fluid guiding structures 50 are provided on the bottom side 16 of the modular conveyor belt 1. Each fluid guiding structure 50 is shaped in a way that an impinging fluid jet (or a water curtain as well) is deflected and the deflected fluid jet is guided towards the adjacent belt module of the adjacent row.

The fluid guiding structures 50 comprise different aspects. Firstly, preferably an arcuate shape is provided so that a fluid jet that impinges in a direction approximately perpendicular to the bottom surface 16 of the belt modules 11, 12 is redirected in a direction that is somewhat parallel to the top surface 13 of the modular conveyor belt 1 (or at a certain angle of maximal about 20°). Due to this arcuate shape, an impinging fluid jet is directed into the region of the gap 15 between the adjacent belt modules 11, 12 and towards the hinge connection between the pivot rod openings 33, 34 and the pivot rod 40 disposed therein.

Secondly, the fluid guiding structures 50 comprise an outwardly fan-shaped portion 51, which is somewhat V-shaped, designed and arranged so as to direct an impinging fluid jet towards the side surfaces of the nearby link ends 31, 32 and towards the exposed sections of the pivot rod 40. By this fan-shaped portion 51 an impinging fluid jet will be spread out along its path.

The fluid guiding structures 50 are made with rounded or arcuate shapes, without edges or corners. They have a channel-like design for guiding the deflected fluid jet towards the adjacent belt module of the adjacent row. They also have a trough-like or shovel-like shape to deflect and guide the impinging fluid jet to the front surface and both side surfaces of the intercalating link end of the adjacent belt module.

FIG. 10 shows a part of modular conveyor belt 100 according to a second embodiment of the invention. Three belt modules 111, 112, 113 are interlinked similar to the belt modules 11, 12 of the first embodiment. The individual belt modules 111, 112, 113 are all identical. Each belt module 111, 112, 113 comprises a first plurality of link ends 131 extending in a direction of belt travel T. Each link end 131 has a pivot rod opening disposed therein in a direction substantially perpendicular to the direction of belt travel T. Each belt module 111, 112, 113 also comprises a second plurality of link ends 132 extending in a direction opposite to the direction of belt travel T. Each link end 132 has a pivot rod opening disposed therein in a direction substantially perpendicular to the direction of belt travel T. Between two link ends 131 or between two link ends 132, there is always an interspace 135 having a width which is bigger than the width of a link end 131 or 132, thus allowing to intercalate a link end 131 or 132 of an adjacent belt module.

The link ends 131 of the first plurality of link ends and the link ends 132 of the second plurality of link ends are offset from each other. The first plurality of link ends 131 of the belt module 111 and the second plurality of link ends 132 of the belt module 112 are intercalated, wherein the link ends 131 and 132 of the belt modules 111 and 112 intercalate into the respective interspaces 135 between the link ends 132 and 131 of the belt modules 112 and 111, respectively. A common pivot rod 140 is disposed through the aligned pivot rod openings and hingedly connects the two belt modules 111 and 112, i.e. a hinge is formed allowing a tilting of the belt modules 111 and 112 with respect to each other. The two belt modules 112 and 113 are connected in a similar way.

Close to the interspaces 135 between the link ends 131 and between the link ends 132 of each belt module 111, 112, 113, fluid guiding structures 150 are provided on the bottom side of the modular conveyor belt 100. The fluid guiding structures 150 comprise an outwardly fan-shaped portion 151 and are shaped and arranged similar to the fluid guiding structures 50 of the first embodiment, but distributed over the whole width of each belt module 111, 112, 113. This is because in contrast to the first embodiment, the modular conveyor belt 100 does not have any middle section that is free of link ends. Apart from this, the design and functionality of the second embodiment is similar to the first embodiment.

In FIG. 11, a belt module 210 according to a third embodiment of the invention is shown. The belt module 210 has two distinct halves 218, 219. The half 218 comprises an end section 237 and a middle section 220. The half 219 comprises an end section 236 and a middle section 223.

Each of the end sections 236, 237 comprises a first plurality of link ends 231 extending in a direction of belt travel and a second plurality of link ends 232 extending in a direction opposite to the direction of belt travel. Each link end 231, 232 has a pivot rod opening disposed therein in a direction substantially perpendicular to the direction of belt travel. Between two link ends 231 or between two link ends 232, there is always an interspace 235 having a width which is bigger than the width of a link end 231 or 232, thus allowing to intercalate a link end 231 or 232 of an adjacent belt module.

The middle sections 220, 223 are free of link ends. The middle section 220 is broader in the direction of belt travel than the middle section 223. The two individual middle sections 220, 223 cut the overall length of the combined middle sections 220, 223 approximately into two halves.

The combined middle sections 220, 223 are shaped in a way that two adjacent belt modules 210 can be connected to each other in an alternating way, where every second belt module is turned by 180°. In this way, it is possible to provide a modular conveyor belt with identical belt modules 210.

Such an alternating arrangement of identical belt modules can be seen in FIGS. 12 and 13, where FIG. 12 shows a bottom view and FIG. 13 shows a top view of a part of a modular belt 200. Three belt modules 210, 230 and 240 are shown, which are interlinked by pivot rods similar to the belt modules 11, 12 of the first embodiment.

All three belt modules 210, 230, 240 are identical, but the belt module 230 is turned by 180° with respect to the belt modules 210 and 240, such that the broader middle section 220 of the belt module 230 is arranged between the smaller middle sections 223 of the belt modules 210 and 240 and the link ends 231, 232 of the belt module 230 intercalate with the link ends 231, 232 of the belt modules 210 and 240. Apart from this, the design and functionality of the third embodiment is similar to the first embodiment.

Close to the interspaces 235 between the link ends 231 and between the link ends 232 of each belt module 210, 230, 240, fluid guiding structures 250 are provided on the bottom side of the modular conveyor belt 200. The fluid guiding structures 250 comprise an outwardly fan-shaped portion and are shaped and arranged similar to the fluid guiding structures 50 of the first embodiment.

FIG. 14 shows a part of modular conveyor belt 300 according to a fourth embodiment of the invention. Three belt modules 311, 312, 313 are interlinked similar to the belt modules 11, 12 of the first embodiment and arranged tilted with respect to each other. The individual belt modules 311, 312, 313 are all identical. Each belt module 311, 312, 313 has a middle section 320 and on both sides of the middle section 320 an end section 330. The end section 330 of each belt module 311, 312, 313 comprises a first plurality of link ends 331 extending in a direction of belt travel T. Each link end 331 has a pivot rod opening disposed therein in a direction substantially perpendicular to the direction of belt travel T. The end section 330 of each belt module 311, 312, 313 also comprises a second plurality of link ends 332 extending in a direction opposite to the direction of belt travel T. Each link end 332 has a pivot rod opening disposed therein in a direction substantially perpendicular to the direction of belt travel T. Between two link ends 331 or between two link ends 332, there is always an interspace 335 having a width which is bigger than the width of a link end 331 or 332, thus allowing to intercalate a link end 331 or 332 of an adjacent belt module.

The link ends 331 of the first plurality of link ends and the link ends 332 of the second plurality of link ends are offset from each other. The first plurality of link ends 331 of the belt module 311 and the second plurality of link ends 332 of the belt module 312 are intercalated, wherein the link ends 331 and 332 of the belt modules 311 and 312 intercalate into the respective interspaces 335 between the link ends 332 and 331 of the belt modules 312 and 311, respectively. A common pivot rod 340 is disposed through the aligned pivot rod openings and hingedly connects the two belt modules 311 and 312, i.e. a hinge is formed allowing a tilting of the belt modules 311 and 312 with respect to each other. The two belt modules 312 and 313 are connected in a similar way.

Close to the interspaces 335 between the link ends 331 and between the link ends 332 of each belt module 311, 312, 313, fluid guiding structures 350 are provided on the bottom side of the end sections 330 of the modular conveyor belt 300. The fluid guiding structures 350 comprise an outwardly fan-shaped portion 351 and are shaped and arranged similar to the fluid guiding structures 50 of the first embodiment.

In contrast to the first embodiment, further fluid guiding structures 360 are provided on the bottom side of the middle section 320 of the modular conveyor belt 300. Each fluid guiding structure 360 is shaped in a way that an impinging fluid jet (or a water curtain as well) is deflected and the deflected fluid jet is guided towards the adjacent belt module of the adjacent row.

The fluid guiding structures 360 comprise different aspects. Firstly, preferably an arcuate shape is provided so that a fluid jet that impinges in a direction approximately perpendicular to the bottom surface of the belt modules 311, 312, 313 is redirected in a direction that is somewhat parallel to the top surface of the modular conveyor belt 300 (or at a certain angle of maximal about 20°). Due to this arcuate shape, an impinging fluid jet is directed into the region of the gap 315 between the adjacent belt modules 311, 312, 313.

Secondly, the fluid guiding structures 360 comprise an outwardly fan-shaped portion 361 designed and arranged so as to spread out an impinging fluid jet along its path.

The fluid guiding structures 360 are made with rounded or arcuate shapes, without edges or corners. They have a channel-like design and a trough-like or shovel-like shape for guiding the deflected fluid jet towards the adjacent belt module of the adjacent row.

Apart from this, the design and functionality of the fourth embodiment is similar to the first embodiment.

The invention claimed is:

1. A modular conveyor belt comprising a first row of one or more belt modules and an interlinked second row of one or more belt modules, wherein at least one of the belt modules of the first row comprises a first plurality of link ends extending in a direction of belt travel (T) and at least one section without link ends, and at least one of the belt modules of the second row comprises a second plurality of link ends extending in a direction opposite to the direction of belt travel (T), the first plurality of link ends and the second plurality of link ends being intercalated and hingedly connected, wherein at least one of the belt modules of the first row comprises on the at least one section without link ends on its bottom side at least one fluid guiding structure comprising an outwardly fan shaped portion designed and arranged so as to deflect a fluid jet impinging on the bottom side and guide the deflected fluid jet towards the second row of one or more belt modules.

2. The modular conveyor belt according to claim 1, wherein the first plurality of link ends have a pivot rod opening disposed therein in a direction substantially perpendicular to the direction of belt travel (T) and the second plurality of link ends have a pivot rod opening disposed therein in a direction substantially perpendicular to the direction of belt travel (T), the first plurality of link ends and the second plurality of link ends being hingedly connected by at least one pivot rod disposed through at least some of the pivot rod openings.

3. The modular conveyor belt according to claim 1, wherein at least one of the belt modules of the second row comprises on its bottom side at least one fluid guiding structure designed and arranged so as to deflect a fluid jet impinging on the bottom side and guide the deflected fluid jet towards the first row of one or more belt modules.

4. The modular conveyor belt according to claim 1, wherein at least one of the fluid guiding structures is shaped without edges or corners.

5. The modular conveyor belt according to claim 1, wherein at least one of the fluid guiding structures has a channel design.

6. The modular conveyor belt according to claim 1, wherein at least one of the fluid guiding structures comprises an outwardly fan-shaped portion designed and arranged so as to direct an impinging fluid jet towards at least one side surface of at least one of the link ends and/or towards at least one exposed section of at least one pivot rod and/or to spread out the impinging fluid jet.

7. The modular conveyor belt according to claim 1, wherein at least one of the fluid guiding structures is arranged between two of the link ends of one of the belt modules.

8. The modular conveyor belt according to claim 1, wherein at least one of the fluid guiding structures has a trough or shovel shape.

9. The modular conveyor belt according to claim 1, wherein at least one of the at least one section without link ends is a middle section.

10. The modular conveyor belt according to claim 1, wherein the top surface of the modular conveyor belt is essentially plane and closed when adjacent rows of one or more belt modules are arranged in a substantially straight line.

11. A modular conveyor belt comprising a first row of one or more belt modules and an interlinked second row of one or more belt modules, wherein at least one of the belt modules of the first row comprises a first plurality of link ends extending in a direction of belt travel (T) and at least one of the belt modules of the second row comprises a second plurality of link ends extending in a direction opposite to the direction of belt travel (T), the first plurality of link ends and the second plurality of link ends being intercalated and hingedly connected, wherein the modular conveyor belt comprises a bottom side, wherein at least one of the belt modules of the first row comprises on its bottom side at least one fluid guiding structure arranged between two of the first plurality of link ends and designed and arranged so as to deflect a fluid jet impinging on the bottom side and guide the deflected fluid jet towards the second row of one or more belt modules, wherein the at least one fluid guiding structure comprises an outwardly fan shaped portion designed and arranged so as to direct the impinging fluid jet towards at least one side surface of at least one of the link ends and/or towards at least one exposed section of at least one pivot rod and/or to spread out the impinging fluid jet, and wherein the at least one fluid guiding structure is shaped without edges or corners and comprises an arcuate shape so that a fluid jet that impinges in a direction approximately perpendicular to the bottom surface is redirected in a direction parallel to a top surface of the modular conveyor belt or at a certain angle of maximal about 20° thereto.

12. The modular conveyor belt according to claim 11, wherein the first plurality of link ends have a pivot rod opening disposed therein in a direction substantially perpendicular to the direction of belt travel (T) and the second plurality of link ends have a pivot rod opening disposed therein in a direction substantially perpendicular to the direction of belt travel (T), the first plurality of link ends and the second plurality of link ends being hingedly connected by at least one pivot rod disposed through at least some of the pivot rod openings.

13. The modular conveyor belt according to claim 11, wherein at least one of the belt modules of the second row comprises on its bottom side at least one fluid guiding structure designed and arranged so as to deflect the fluid jet impinging on the bottom side and guide the deflected fluid jet towards the first row of one or more belt modules.

14. The modular conveyor belt according to claim 13, wherein at least one of the fluid guiding structures of at least one of the belt modules of the second row is arranged between two of the second plurality of link ends.

15. The modular conveyor belt according to claim 11, wherein at least one of the fluid guiding structures has a channel design.

16. The modular conveyor belt according to claim 11, wherein at least one of the fluid guiding structures has a trough or shovel shape.

17. The modular conveyor belt according to claim 11, wherein at least one of the belt modules comprises at least one section without link ends.

18. The modular conveyor belt according to claim 17, wherein at least one further fluid guiding structure is arranged on at least one of the sections without link ends.

19. The modular conveyor belt according to claim 11, wherein the top surface of the modular conveyor belt is essentially plane and closed when adjacent rows of one or more belt modules are arranged in a substantially straight line.

20. A modular conveyor belt comprising a first row of one or more belt modules and an interlinked second row of one or more belt modules, wherein at least one of the belt modules of the first row comprises a first plurality of link ends extending in a direction of belt travel (T) and at least one of the belt modules of the second row comprises a second plurality of link ends extending in a direction opposite to the direction of belt travel (T), the first plurality of link ends and the second plurality of link ends being intercalated and hingedly connected, wherein the modular conveyor belt comprises a bottom side, wherein at least one of the belt modules of the first row comprises on its bottom side at least one fluid guiding structure arranged between two of the first plurality of link ends and designed and arranged so as to deflect a fluid jet impinging on the bottom side and guide the deflected fluid jet towards the second row of one or more belt modules, wherein the at least one fluid guiding structure comprises an outwardly fan-shaped portion designed and arranged so as to direct the impinging fluid jet towards at least one side surface of at least one of the link ends and/or towards at least one exposed section of at least one pivot rod and/or to spread out the impinging fluid jet, wherein the at least one fluid guiding structure comprises an arcuate shape so that a fluid jet that impinges in a direction approximately perpendicular to the bottom surface is redirected in a direction parallel to a top surface of the modular conveyor belt or at a certain angle of maximal about 20° thereto, and wherein at least one of the belt modules comprises at least one section without link ends and at least one further fluid guiding structure is arranged on the at least one section without link ends.

21. The modular conveyor belt according to claim 17, wherein the at least one section without link ends is a middle section.

22. The modular conveyor belt according to claim 18, wherein the at least one section without link ends is a middle section.

23. The modular conveyor belt according to claim 20, wherein the at least one section without link ends is a middle section.

* * * * *